United States Patent
Cha et al.

(10) Patent No.: US 8,681,103 B2
(45) Date of Patent: Mar. 25, 2014

(54) MOBILE TERMINAL

(75) Inventors: Yongduk Cha, Goyang (KR); Changgui Sung, Anyang (KR)

(73) Assignee: LG Electronics Inc., Seoul (KR)

( * ) Notice: Subject to any disclaimer, the term of this patent is extended or adjusted under 35 U.S.C. 154(b) by 839 days.

(21) Appl. No.: 12/824,620

(22) Filed: Jun. 28, 2010

(65) Prior Publication Data

US 2011/0006992 A1    Jan. 13, 2011

(30) Foreign Application Priority Data

Jul. 7, 2009   (KR) .................. 10-2009-0061856

(51) Int. Cl.
*G06F 3/02*      (2006.01)
*G06F 3/041*     (2006.01)

(52) U.S. Cl.
USPC .......................................... 345/169; 345/173

(58) Field of Classification Search
None
See application file for complete search history.

(56) References Cited

U.S. PATENT DOCUMENTS

| 6,542,606 B1 * | 4/2003 | Lehtinen et al. ......... 379/433.05 |
| 2004/0023696 A1 * | 2/2004 | Kim ............................. 455/566 |

FOREIGN PATENT DOCUMENTS

| CN | 101382822 A | 3/2009 |
| EP | 1 259 048 A2 | 11/2002 |
| WO | WO 00/65804 A1 | 11/2000 |

OTHER PUBLICATIONS

European Search Report dated Nov. 8, 2010 issued in Application No. 10 16 7085.
Chinese Office Action dated Nov. 5, 2012 issued in Application No. 201010226057.5 (with English translation).

* cited by examiner

*Primary Examiner* — Adam R Giesy
(74) *Attorney, Agent, or Firm* — KED & Associates LLP

(57) ABSTRACT

A mobile terminal includes: a terminal body having a radio communication function; a touch screen mounted on a front surface of the terminal body and outputting touch inputtable visual information; a keypad connected with one end of the terminal body, inputting information to the terminal body, and formed to be detachably attached to front and rear surface of the terminal body to implement a first status in which the keypad is mounted on the rear surface of the terminal body and a second status in which the keypad is mounted on the front surface; and a controller configured to execute a first input mode through the touch screen in the first status and a second input mode through the keypad in the second status.

14 Claims, 15 Drawing Sheets

MOBILE TERMINAL

CROSS REFERENCE TO RELATED APPLICATIONS

Pursuant to 35 U.S.C. §119, this application claims the benefit of Korean Application No. 10-2009-0061856, filed on Jul. 7, 2009, the contents of which is hereby incorporated by reference herein in its entirety.

BACKGROUND OF THE INVENTION

1. Field of the Invention

The present invention relates to a mobile terminal including a touch screen.

2. Description of the Related Art

Terminals may be divided into a mobile terminal (portable terminal) and a stationary terminal according to whether the terminal is portable or not. The mobile terminals may be divided into a handheld terminal that can be directly carried around and a vehicle mount terminal.

As functions are becoming diversified, terminals are implemented in the form of multimedia players supporting complex functions such as capturing images or video, reproducing music or video files, playing games, receiving broadcasts, etc.

In order to support or increase the functions of the terminals, modifications of structural parts and/or software parts of the terminals may be taken into consideration.

Recently, applications of a touch screen to mobile terminals are increasing. A touch screen simultaneously performs inputting and outputting of information, so it can reduce a disposition space of an input unit and implement a large-scale display, thus implementing more intuitional and convenient user interface, and as such, the touch screen thus receives much attention.

However, the touch screen does not have a structure in which at least a portion thereof is relatively moved, so it is not suitable to provide a physical click sensation to users, and in some cases, such touch screen structure may cause a user inconvenience when the user performs inputting.

SUMMARY OF THE INVENTION

Accordingly, one object of the present invention is to provide a mobile terminal having an interface which is conveniently opened and closed.

Another object of the present invention is to provide a mobile terminal that can use both input methods through a touch screen and a mechanical keypad while utilizing the entire area of the touch screen.

To achieve these and other advantages and in accordance with the purpose of the present invention, as embodied and broadly described herein, the present invention provides in one aspect a mobile terminal including: a terminal body having a radio communication function; a touch screen mounted on a front surface of the terminal body and outputting touch inputtable visual information; a flip keypad having a plurality of keys on a surface thereof, the flip keypad being connected to one end of the terminal body such that the flip keypad is reversibly turned over from a first state in which the flip keypad faces the rear surface of the terminal body to a second state in which the flip keypad faces the front surface of the terminal body; and a controller configured to execute a first input mode through the touch screen in the first status and a second input mode through the keypad in the second status.

The touch screen may include a first area covered by the flip keypad in the second status; and a second area exposed in the second status and outputting information inputted through the flip keypad in the second status.

The touch screen may display first visual information at the first and second areas in the first status, and second visual information at the second area in the second status.

The flip keypad may include: a keypad main body having a plurality of key buttons; and a connection member rotatably connecting the keypad main body to the terminal body.

The mobile terminal may further include: an attaching and detaching unit configured to detachably attach the keypad main body to the rear and front surfaces of the terminal body; and an attaching and detaching sensor configured to sense mounting of the keypad main body on the front and rear surfaces of the terminal body and transfer corresponding information to the controller.

To achieve these and other advantages and in accordance with the purpose of the present invention, as embodied and broadly described herein, the present invention provides in another aspect a method for controlling a mobile terminal, including: executing a first input mode in a touch screen disposed on a front surface of a terminal body; detecting the position of the flip keypad, connected with one end of the terminal body, with respect to the terminal body so that the flip keypad can selectively overlap with one of the front and rear surfaces of the terminal body; and when the flip keypad partially covers the touch screen, outputting an area that can be inputted by the flip keypad to an exposed area of the touch screen and executing a second input mode.

The second input mode may include at least one of dialing, messaging, Web browsing, looking up dictionary, a messenger, and a file transmission.

Further scope of applicability of the present invention will become apparent from the detailed description given hereinafter. However, it should be understood that the detailed description and specific examples, while indicating preferred embodiments of the invention, are given by illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings, which are given by illustration only, and thus are not limitative of the present invention, and wherein.

DETAILED DESCRIPTION OF THE INVENTION

A mobile terminal according to exemplary embodiments of the present invention will now be described with reference to the accompanying drawings. In the following description, usage of suffixes such as 'module', 'part' or 'unit' used for referring to elements is given merely to facilitate explanation of the present invention, without having any significant meaning by itself.

The mobile terminal described in the present invention may include mobile phones, smart phones, notebook computers, digital broadcast receivers, PDAs (Personal Digital Assistants), PMPs (Portable Multimedia Player), navigation devices, and the like.

Figure 1:
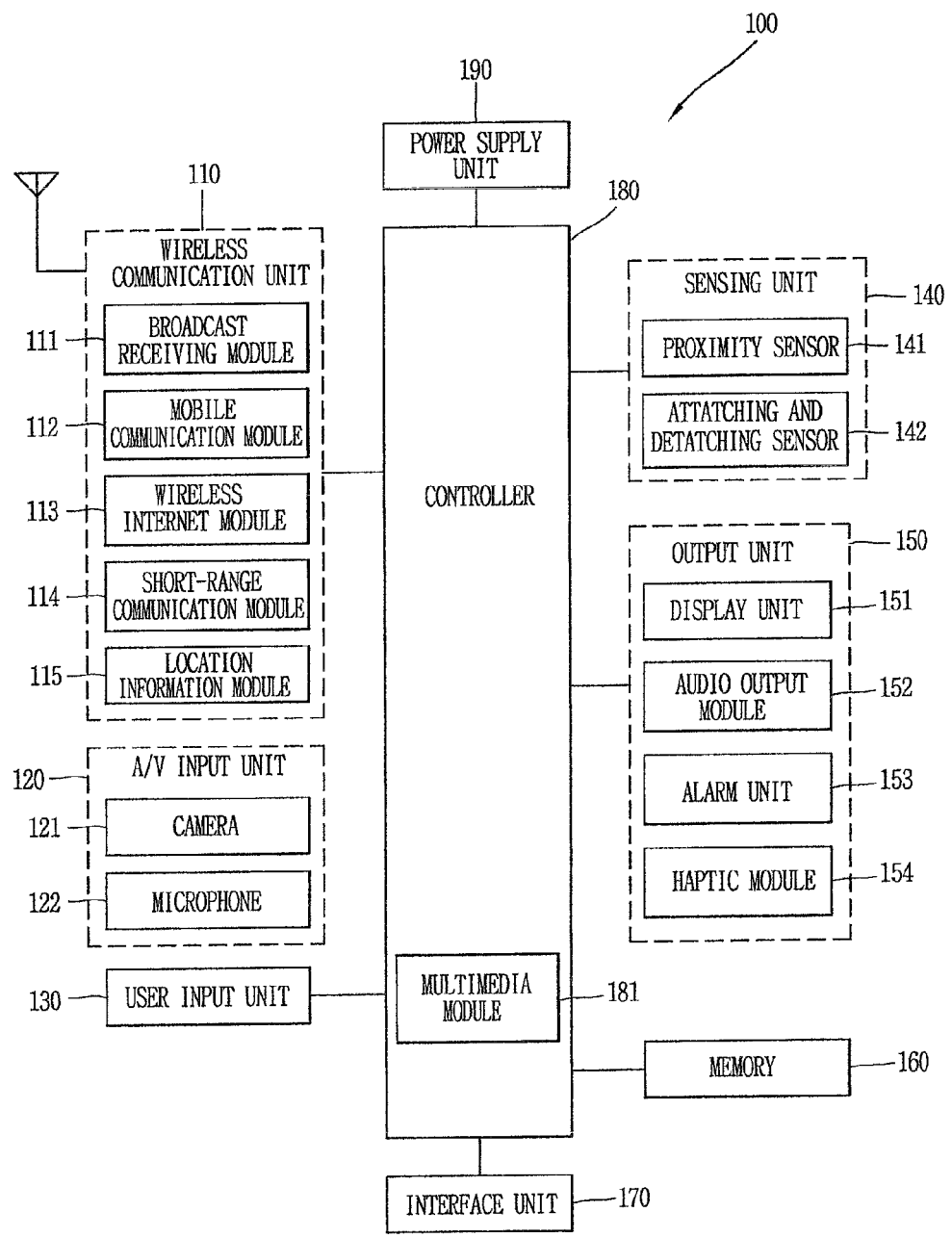
FIG. 1 is a schematic block diagram of a mobile terminal according to an exemplary embodiment of the present invention.

FIG. 1 is a block diagram of a mobile terminal according to an embodiment of the present invention.

The mobile terminal 100 may include a wireless communication unit 110, an A/V (Audio/Video) input unit 120, a user input unit 130, a sensing unit 140, an output unit 150, a memory 160, an interface unit 170, a controller 180, and a power supply unit 190, etc. FIG. 1 shows the mobile terminal as having various components, but it should be understood that implementing all of the illustrated components is not a requirement. Greater or fewer components may alternatively be implemented.

The elements of the mobile terminal will be described in detail as follows.

The wireless communication unit 110 typically includes one or more components allowing radio communication between the mobile terminal 100 and a wireless communication system or a network in which the mobile terminal is located. For example, the wireless communication unit may include at least one of a broadcast receiving module 111, a mobile communication module 112, a wireless Internet module 113, a short-range communication module 114, and a location information module 115.

The broadcast receiving module 111 receives broadcast signals and/or broadcast associated information from an external broadcast management server (or other network entity) via a broadcast channel.

The broadcast channel may include a satellite channel and/or a terrestrial channel. The broadcast management server may be a server that generates and transmits a broadcast signal and/or broadcast associated information or a server that receives a previously generated broadcast signal and/or broadcast associated information and transmits the same to a terminal. The broadcast signal may include a TV broadcast signal, a radio broadcast signal, a data broadcast signal, and the like. Also, the broadcast signal may further include a broadcast signal combined with a TV or radio broadcast signal.

The broadcast associated information may refer to information associated with a broadcast channel, a broadcast program or a broadcast service provider. The broadcast associated information may also be provided via a mobile communication network and, in this case, the broadcast associated information may be received by the mobile communication module 112.

The broadcast signal may exist in various forms. For example, it may exist in the form of an electronic program guide (EPG) of digital multimedia broadcasting (DMB), electronic service guide (ESG) of digital video broadcast-handheld (DVB-H), and the like.

The broadcast receiving module 111 may be configured to receive signals broadcast by using various types of broadcast systems. In particular, the broadcast receiving module 111 may receive a digital broadcast by using a digital broadcast system such as multimedia broadcasting-terrestrial (DMB-T), digital multimedia broadcasting-satellite (DMB-S), digital video broadcast-handheld (DVB-H), the data broadcasting system known as media forward link only (MediaFLO®), integrated services digital broadcast-terrestrial (ISDB-T), etc. The broadcast receiving module 111 may be configured to be suitable for every broadcast system that provides a broadcast signal as well as the above-mentioned digital broadcast systems.

Broadcast signals and/or broadcast-associated information received via the broadcast receiving module 111 may be stored in the memory 160 (or another type of storage medium).

The mobile communication module 112 transmits and/or receives radio signals to and/or from at least one of a base station (e.g., access point, Node B, etc.), an external terminal (e.g., other user devices) and a server (or other network entities). Such radio signals may include a voice call signal, a video call signal or various types of data according to text and/or multimedia message transmission and/or reception.

The wireless Internet module 113 supports wireless Internet access for the mobile terminal. This module may be internally or externally coupled to the terminal. The wireless Internet access technique implemented may include a WLAN (Wireless LAN) (Wi-Fi), Wibro (Wireless broadband), Wimax (World Interoperability for Microwave Access), HSDPA (High Speed Downlink Packet Access), or the like.

The short-range communication module 114 is a module for supporting short range communications. Some examples of short-range communication technology include Bluetooth™, Radio Frequency IDentification (RFID), Infrared Data Association (IrDA), Ultra-WideBand (UWB), ZigBee™, and the like.

The location information module 115 is a module for checking or acquiring a location (or position) of the mobile terminal. A typical example of the location information module is a GPS (Global Positioning System).

The A/V input unit 120 is configured to receive an audio or video signal. The NV input unit 120 may include a camera 121 (or other image capture device) and a microphone 122 (or other sound pick-up device). The camera 121 processes image data of still pictures or video obtained by an image capture device in a video capturing mode or an image capturing mode. The processed image frames may be displayed on a display unit 151 (or other visual output device).

The image frames processed by the camera 121 may be stored in the memory 160 (or other storage medium) or transmitted via the wireless communication unit 110. Two or more cameras 121 may be provided according to the configuration of the mobile terminal.

The microphone 122 may receive sounds (audible data) via a microphone (or the like) in a phone call mode, a recording mode, a voice recognition mode, and the like, and can process such sounds into audio data. The processed audio (voice) data may be converted for output into a format transmittable to a mobile communication base station (or other network entity) via the mobile communication module 112 in case of the phone call mode. The microphone 122 may implement various types of noise canceling (or suppression) algorithms to cancel (or suppress) noise or interference generated in the course of receiving and transmitting audio signals.

The user input unit 130 (or other user input device) may generate input data from commands entered by a user to control various operations of the mobile terminal. The user input unit 130 may include a flip keypad, a dome switch, a touch pad (e.g., a touch sensitive member that detects changes in resistance, pressure, capacitance, etc. due to being contacted) a jog wheel, a jog switch, and the like.

The sensing unit 140 (or other detection means) detects a current status (or state) of the mobile terminal 100 such as an opened or closed state of the mobile terminal 100, a location of the mobile terminal 100, the presence or absence of user contact with the mobile terminal 100 (i.e., touch inputs), the orientation of the mobile terminal 100, an acceleration or deceleration movement and direction of the mobile terminal 100, etc., and generates commands or signals for controlling the operation of the mobile terminal 100. For example, when the mobile terminal 100 is implemented as a slide type mobile phone, the sensing unit 140 may sense whether the slide phone is opened or closed. In addition, the sensing unit 140 can detect whether or not the power supply unit 190 supplies power or whether or not the interface unit 170 is coupled with an external device. The sensing unit 140 may include a proximity sensor 141.

The output unit 150 is configured to provide outputs in a visual, audible, and/or tactile manner (e.g., audio signal, video signal, alarm signal, vibration signal, etc.). The output unit 150 may include the display unit 151, an audio output module 152, an alarm unit 153, a haptic module 154, and the like.

The display unit 151 may display (output) information processed in the mobile terminal 100. For example, when the mobile terminal 100 is in a phone call mode, the display unit 151 may display a User Interface (UI) or a Graphic User Interface (GUI) associated with a call or other communication (such as text messaging, multimedia file downloading, etc.). When the mobile terminal 100 is in a video call mode or image capturing mode, the display unit 151 may display a captured image and/or received image, a UI or GUI that shows videos or images and functions related thereto, and the like.

The display unit 151 may include at least one of a Liquid Crystal Display (LCD), a Thin Film Transistor-LCD (TFT-LCD), an Organic Light Emitting Diode (OLED) display, a flexible display, a three-dimensional (3D) display, or the like.

Some of them may be configured to be transparent or light-transmissive to allow viewing of the exterior, which may be called transparent displays. A typical transparent display may be, for example, a TOLED (Transparent Organic Light Emitting Diode) display, or the like. Through such configuration, the user can view an object positioned at the rear side of the terminal body through the region occupied by the display unit 151 of the terminal body.

The mobile terminal 100 may include two or more display units (or other display means) according to its particular desired embodiment. For example, a plurality of display units may be separately or integrally disposed on one surface of the mobile terminal, or may be separately disposed on mutually different surfaces.

Meanwhile, when the display unit 151 and a sensor (referred to as a 'touch sensor', hereinafter) for detecting a touch operation are overlaid in a layered manner to form a touch screen, the display unit 151 may function as both an input device and an output device. The touch sensor may have a form of a touch film, a touch sheet, a touch pad, and the like.

The touch sensor may be configured to convert pressure applied to a particular portion of the display unit 151 or a change in the capacitance or the like generated at a particular portion of the display unit 151 into an electrical input signal. The touch sensor may be configured to detect the pressure when a touch is applied, as well as the touched position and area.

When there is a touch input with respect to the touch sensor, a corresponding signal (signals) are transmitted to a touch controller. The touch controller processes the signals and transmits corresponding data to the controller 180. Accordingly, the controller 180 may recognize which portion of the display unit 151 has been touched.

With reference to FIG. 1, a proximity sensor 141 may be disposed within or near the touch screen. The proximity sensor 141 is a sensor for detecting the presence or absence of an object relative to a certain detection surface or an object that exists nearby by using the force of electromagnetism or infrared rays without a physical contact. Thus, the proximity sensor 141 has a considerably longer life span compared with a contact type sensor, and it can be utilized for various purposes.

Examples of the proximity sensor 141 may include a transmission type photoelectric sensor, a direct reflection type photoelectric sensor, a mirror-reflection type photo sensor, an RF oscillation type proximity sensor, a capacitance type proximity sensor, a magnetic proximity sensor, an infrared proximity sensor, and the like. In case where the touch screen is the capacitance type, proximity of the pointer is detected by a change in electric field according to the proximity of the pointer. In this case, the touch screen (touch sensor) may be classified as a proximity sensor.

In the following description, for the sake of brevity, recognition of the pointer positioned to be close to the touch screen will be called a 'proximity touch', while recognition of actual contacting of the pointer on the touch screen will be called a 'contact touch'. In this case, when the pointer is in the state of the proximity touch, it means that the pointer is positioned to correspond vertically to the touch screen.

By employing the proximity sensor 141, a proximity touch and a proximity touch pattern (e.g., a proximity touch distance, a proximity touch speed, a proximity touch time, a proximity touch position, a proximity touch movement state, or the like) can be detected, and information corresponding to the detected proximity touch operation and the proximity touch pattern can be outputted to the touch screen.

The audio output module 152 may convert and output as sound audio data received from the wireless communication unit 110 or stored in the memory 160 in a call signal reception mode, a call mode, a record mode, a voice recognition mode, a broadcast reception mode, and the like. Also, the audio output module 152 may provide audible outputs related to a particular function performed by the mobile terminal 100 (e.g., a call signal reception sound, a message reception sound, etc.). The audio output module 152 may include a speaker, a buzzer, or other sound generating device.

The alarm unit 153 (or other type of user notification means) may provide outputs to inform about the occurrence of an event of the mobile terminal 100. Typical events may include call reception, message reception, key signal inputs, a touch input etc. In addition to audio or video outputs, the alarm unit 153 may provide outputs in a different manner to inform about the occurrence of an event. For example, the alarm unit 153 may provide an output in the form of vibrations (or other tactile or sensible outputs). When a call, a message, or some other incoming communication is received, the alarm unit 153 may provide tactile outputs (i.e., vibrations) to inform the user thereof. By providing such tactile outputs, the user can recognize the occurrence of various events even if his mobile phone is in the user's pocket. Outputs informing about the occurrence of an event may be also provided via the display unit 151 or the audio output module 152. The display unit 151 and the audio output module 152 may be classified as a part of the alarm unit 153.

A haptic module 154 generates various tactile effects the user may feel. A typical example of the tactile effects generated by the haptic module 154 is vibration. The strength and pattern of the haptic module 154 can be controlled. For example, different vibrations may be combined to be outputted or sequentially outputted.

Besides vibration, the haptic module 154 may generate various other tactile effects such as an effect by stimulation such as a pin arrangement vertically moving with respect to a contact skin, a spray force or suction force of air through a jet orifice or a suction opening, a contact on the skin, a contact of an electrode, electrostatic force, etc., an effect by reproducing the sense of cold and warmth using an element that can absorb or generate heat.

The haptic module 154 may be implemented to allow the user to feel a tactile effect through a muscle sensation such as fingers or arm of the user, as well as transferring the tactile effect through a direct contact. Two or more haptic modules 154 may be provided according to the configuration of the mobile terminal 100.

The memory 160 may store software programs used for the processing and controlling operations performed by the controller 180, or may temporarily store data (e.g., a phonebook, messages, still images, video, etc.) that are inputted or outputted. In addition, the memory 160 may store data regarding various patterns of vibrations and audio signals outputted when a touch is inputted to the touch screen.

The memory 160 may include at least one type of storage medium including a Flash memory, a hard disk, a multimedia card micro type, a card-type memory (e.g., SD or DX memory, etc), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, and an optical disk. Also, the mobile terminal 100 may be operated in relation to a web storage device that performs the storage function of the memory 160 over the Internet.

The interface unit 170 serves as an interface with every external device connected with the mobile terminal 100. For example, the external devices may transmit data to an external device, receives and transmits power to each element of the mobile terminal 100, or transmits internal data of the mobile terminal 100 to an external device. For example, the interface unit 170 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating the authority of using the mobile terminal 100 and may include a user identity module (UIM), a subscriber identity module (SIM) a universal subscriber identity module (USIM), and the like. In addition, the device having the identification module (referred to as 'identifying device', hereinafter) may take the form of a smart card. Accordingly, the identifying device may be connected with the terminal 100 via a port.

When the mobile terminal 100 is connected with an external cradle, the interface unit 170 may serve as a passage to allow power from the cradle to be supplied therethrough to the mobile terminal 100 or may serve as a passage to allow various command signals inputted by the user from the cradle to be transferred to the mobile terminal therethrough. Various command signals or power inputted from the cradle may operate as signals for recognizing that the mobile terminal is properly mounted on the cradle.

The controller 180 typically controls the general operations of the mobile terminal. For example, the controller 180 performs controlling and processing associated with voice calls, data communications, video calls, and the like. The controller 180 may include a multimedia module 181 for reproducing multimedia data. The multimedia module 181 may be configured within the controller 180 or may be configured to be separated from the controller 180.

The controller 180 may perform a pattern recognition processing to recognize a handwriting input or a picture drawing input performed on the touch screen as characters or images, respectively.

The power supply unit 190 receives external power or internal power and supplies appropriate power required for operating respective elements and components under the control of the controller 180.

Various embodiments described herein may be implemented in a computer-readable or its similar medium using, for example, software, hardware, or any combination thereof.

For hardware implementation, the embodiments described herein may be implemented by using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic units designed to perform the functions described herein. In some cases, such embodiments may be implemented by the controller 180 itself.

For software implementation, the embodiments such as procedures or functions described herein may be implemented by separate software modules. Each software module may perform one or more functions or operations described herein. Software codes can be implemented by a software application written in any suitable programming language. The software codes may be stored in the memory 160 and executed by the controller 180.

Figure 2A:
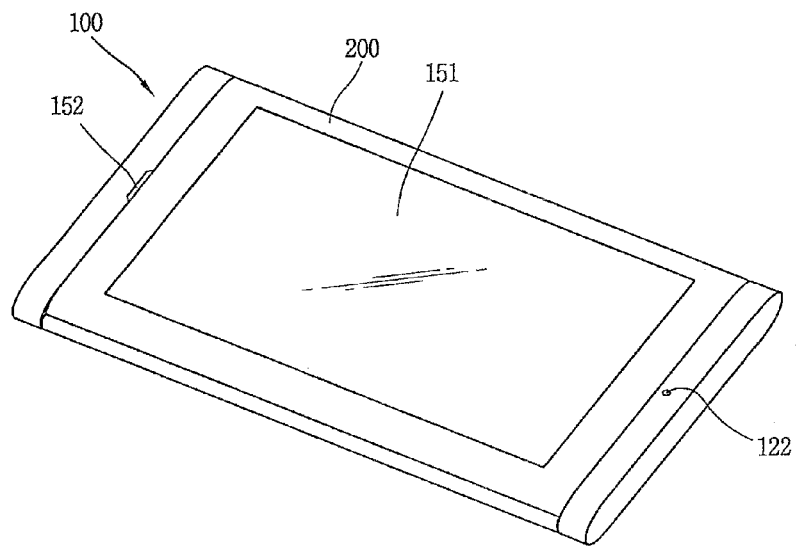
FIGS. 2A to 2C are front perspective views of the mobile terminal according to an exemplary embodiment of the present invention.
Figure 2B:
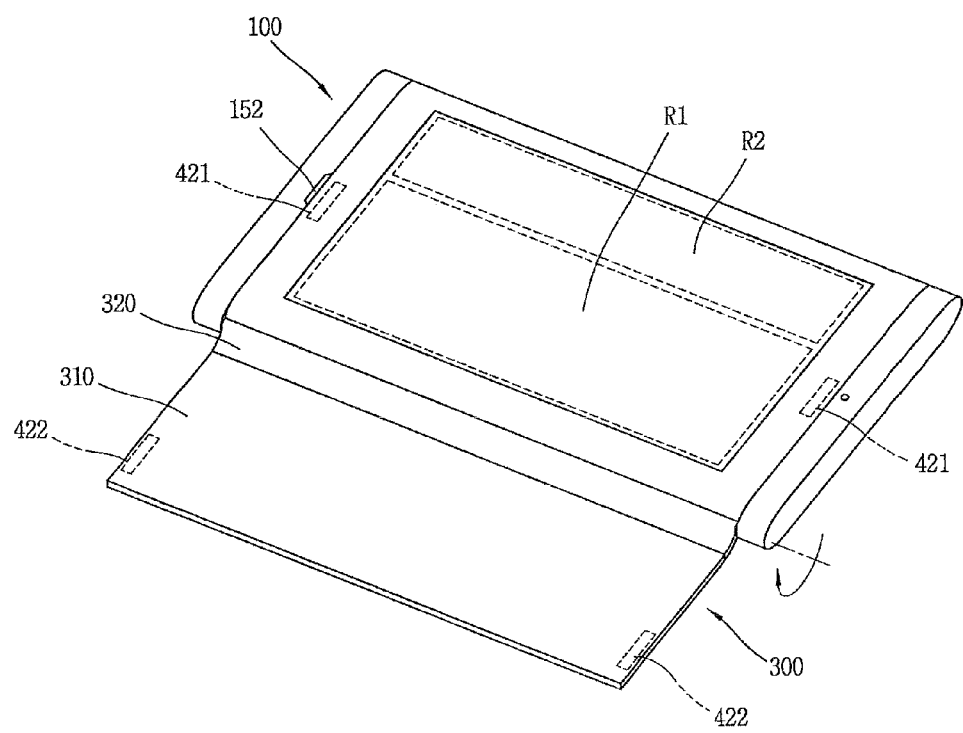
Figure 2C:
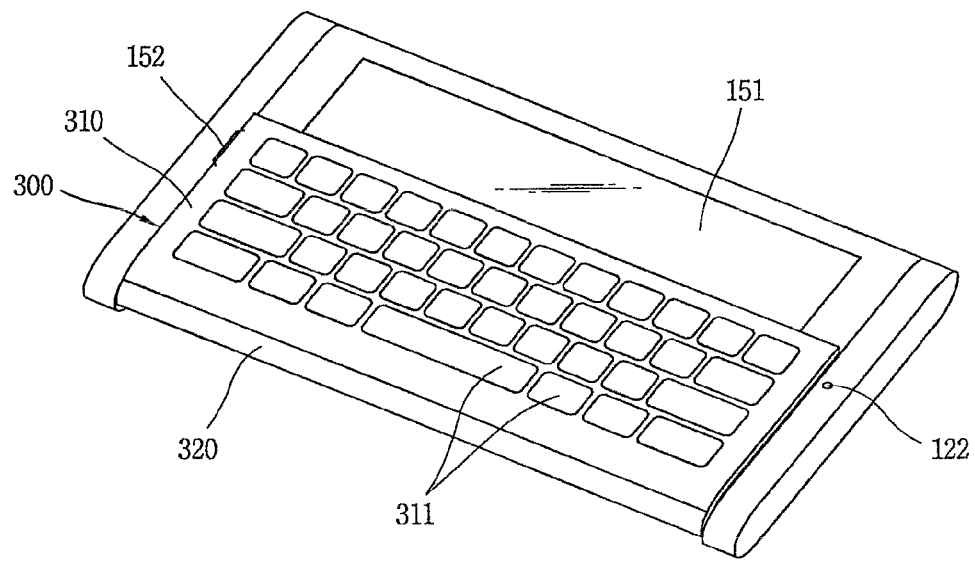
Figure 3:
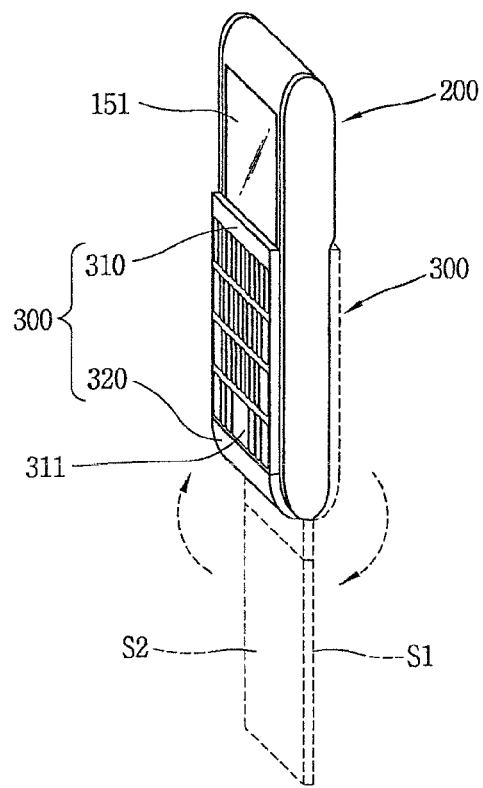
FIG. 3 is a side perspective view showing an operational state of the mobile terminal according to an exemplary embodiment of the present invention.

FIGS. 2A to 2C are front perspective views of the mobile terminal according to an exemplary embodiment of the present invention. FIG. 3 is a side perspective view showing an operational state of the mobile terminal according to an exemplary embodiment of the present invention.

The mobile terminal 100 according to an exemplary embodiment of the present invention includes a terminal body 200 and a flip keypad 300 connected with the terminal body 200.

A wireless communication unit 110 (See FIG. 1) provided within the terminal body 200 in order to perform a radio communication function.

The terminal body 200 includes the case (or casing, housing, cover, etc.) constituting the external appearance. The cases may be formed by injection-molding a synthetic resin or may be made of a metallic material such as stainless steel (STS) or titanium (Ti), etc.

A display unit 151, an audio output unit 152, a microphone 152, and the like, may be disposed on the front surface of the terminal body 200.

The display unit 151 occupies the most parts of a circumferential surface of the terminal body 200. The following description will be based on the implementation of the display unit 151 in the form of a 'touch screen' outputting visual information that can be touch-inputted, and in the following description, the 'display unit 151' will be referred to as a 'touch screen 151' for the sake of explanation.

The audio output unit 151 is disposed at an area adjacent to one end portion among both end portions of the touch screen 151, and the microphone 122 is disposed at an area adjacent to the other end portion.

The flip keypad 300 is configured to input information for controlling the operation of the mobile terminal 100 and connected with one end of the terminal body 200. With reference to FIG. 3, the flip keypad 300 can be rotatably connected with one end of the terminal body 200 and may be detachably attached to the rear and front surfaces of the terminal body 200, respectively.

In the present exemplary embodiment, the state in which the flip keypad 300 is mounted on the rear surface of the terminal body 200 will be referred to as a 'first status', and a state in which the flip keypad 300 is mounted on the front surface of the terminal body 200 will be referred to as a 'second status'.

FIG. 2A shows the first status in which the flip keypad 300 is mounted on the rear surface of the terminal body 200, FIG. 2B shows a state in which the flip keypad is separated from the rear surface of the terminal body 200, and FIG. 2C shows the second status in which the flip keypad 300 is mounted on the front surface of the terminal body 200. FIG. 3 shows the sequential process of changing the mobile terminal from the first status to the second status.

With reference to FIG. 2B, the touch screen 151 may include a first area R1 and a second area R2.

The first area R1 is covered by the flip keypad 300 in the second status, and the second area R2 is exposed in the second status. The first area R1 and the second area R2 configure the entire screen of the touch screen 151 and are exposed in the first status.

The touch screen 151 may output visual information to the first area R1 and the second area R2, namely, to the entire screen, in the first status as shown in FIG. 2A. Meanwhile, the touch screen outputs information inputted through the flip keypad 300 to the second area R2 in the second status. In this case, the touch screen 151 can output visual information only to the second area R2 in the second status.

In this manner, the mobile terminal provides a novel foam factor providing a combined use of the input schemes through the touch screen 151 and the flip keypad 300 while using the entire area of the touch screen 151.

Accordingly to the present exemplary embodiment, the flip keypad 300 may include a keypad main body 310 and a connection member 320.

The keypad main body 310 may have a form of a plate having a smaller area than that of the front surface of the terminal body 200. The case constituting the external appearance of the keypad main body 310 may be formed by injection-molding a synthetic resin or may be made of a metallic material. Electronic components such as a printed circuit board (PCB), or the like, are mounted within the case. The keypad main body 310 is configured to cover the rear surface of the terminal body 200 in the first status, and cover the first area R1 of the touch screen 151 in the second status.

A plurality of key buttons 311 are mounted on the keypad main body 310. Characters, numbers, symbols, and the like, used for an inputting operation in the mobile terminal are displayed on the key buttons.

The key buttons 311 may be arranged in a Qwerty form on the keypad main body 310. This is to allow the user to more conveniently input information by arranging the key buttons such that they are similar to those of computer key boards. The key buttons 311 may be implemented in the form of dome switches for inputting information through a pressing manipulation, and this kind of structure provides a click sensation to the user when key inputting is performed in the second status.

With reference to FIG. 3, the keypad main body 310 includes a first face S1 and a second face S2.

Key buttons 311 are arranged on the first face S1 of the keypad main body 310. The first face S1 of the keypad main body 310 is mounted on the rear surface of the terminal body 200 in the first status, and exposed in the firs status.

The second face S2 of the keypad main body 310 is in the opposite direction of the first face S1. The second face S2 of the keypad body 310 is exposed in the first status, and mounted on the front surface of the terminal body 200 in the second status.

Meanwhile, the connection member 320 rotatably connects the keypad main body 310 to the terminal body 200. According to the present exemplary embodiment, one end of the connection member 320 is rotatably connected with the terminal body 200, and the other end is fixed to the keypad main body 310. Without being limited thereto, the connection member 320 may be configured such that both ends thereof are rotatably connected with the terminal body 200 and the keypad main body 310.

The connection member 320 may be configured to be deformed when the mobile terminal is changed from the first status to the second status or from the second status to the first status. Both sides of the connection member 320 are in contact with the rear and front surfaces of the terminal body 200 in the first and second statuses, and in this case, the connection member 320 may be deformed to correspond to the front and rear surfaces of the terminal body 200. The connection member 320 may be made of a material that can be elastically deformed, e.g., rubber, silicon, flexible plastic, and the like.

Figure 4:
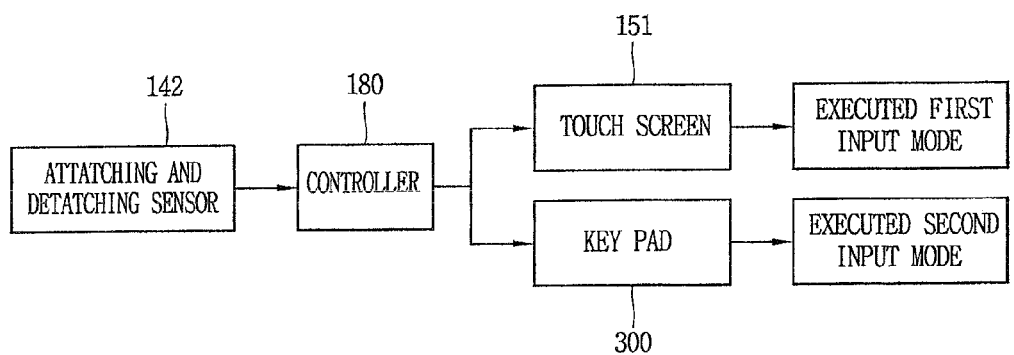
FIG. 4 is a schematic block diagram showing an operational state of the mobile terminal according to an exemplary embodiment of the present invention.

FIG. 4 is a schematic block diagram showing an operational state of the mobile terminal according to an exemplary embodiment of the present invention. Arrows in FIG. 4 indicate a signal flow.

The mobile terminal according to an exemplary embodiment of the present invention includes an attaching and detaching sensor 142 configured to sense mount of the keypad main body 310 on the front or rear surface of the terminal body 200 and transfer corresponding information to the controller 180.

The attaching and detaching sensor 142 may be implemented to have any form so long as it can sense whether or not the keypad main body 310 is mounted. For example, the attaching and detaching sensor 142 may be implemented in the form of a proximity sensor. Also, when the keypad main body 310 includes magnets, the attaching and detaching sensor 142 may be implemented in the form of a magnetic sensor for sensing the strength of a magnetic field generated from the magnets.

When the keypad main body is mounted on the front or rear surface of the terminal body 200, the attaching and detaching sensor 142 senses that and transfers corresponding information to the controller 180. Then, the controller 180 executes various input modes based on the information.

When the mobile terminal is in the first status, the controller 180 executes the first input mode through the touch screen 151. In this case, the controller 180 applies a command for activating the touch screen 151 to the touch screen. Accordingly, the touch screen 151 displays 'first visual information' on the first and second areas S1 and S2, namely, on the entire screen, in the first status.

When the mobile terminal is in the second status, the controller 180 executes a second input mode through the flip keypad 300. The controller 180 applies a corresponding command to the flip keypad 300 so that inputting can be performed through the flip keypad 300. When there is an input through the flip keypad 300 in the second status, the touch screen 151 displays 'second visual information' on the second area R2.

In this manner, when the mobile terminal is changed to the second state, the controller 180 may control the touch screen 151 to deactivate the first area R1 of the touch screen 151.

Figure 5A:
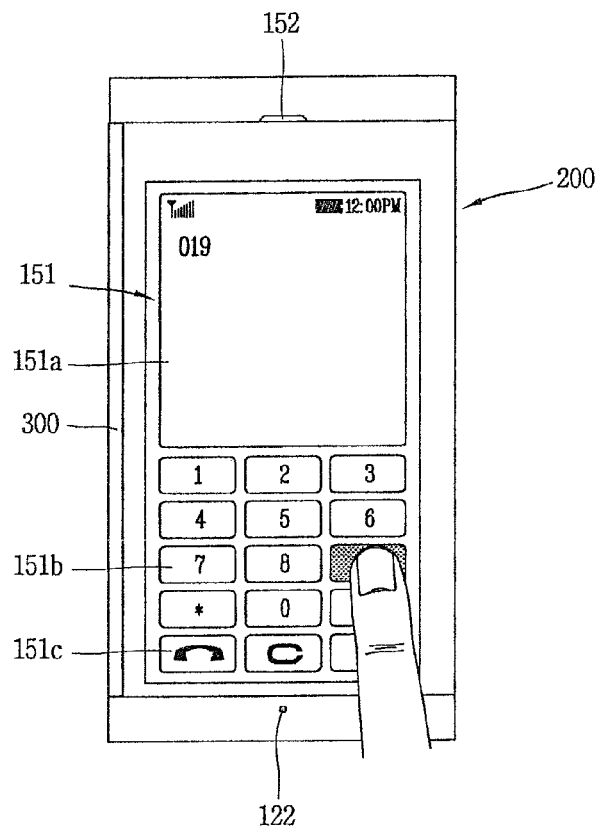
FIGS. 5A to 5C are front views showing first examples of the operational state of the mobile terminal according to an exemplary embodiment of the present invention.
Figure 5B:
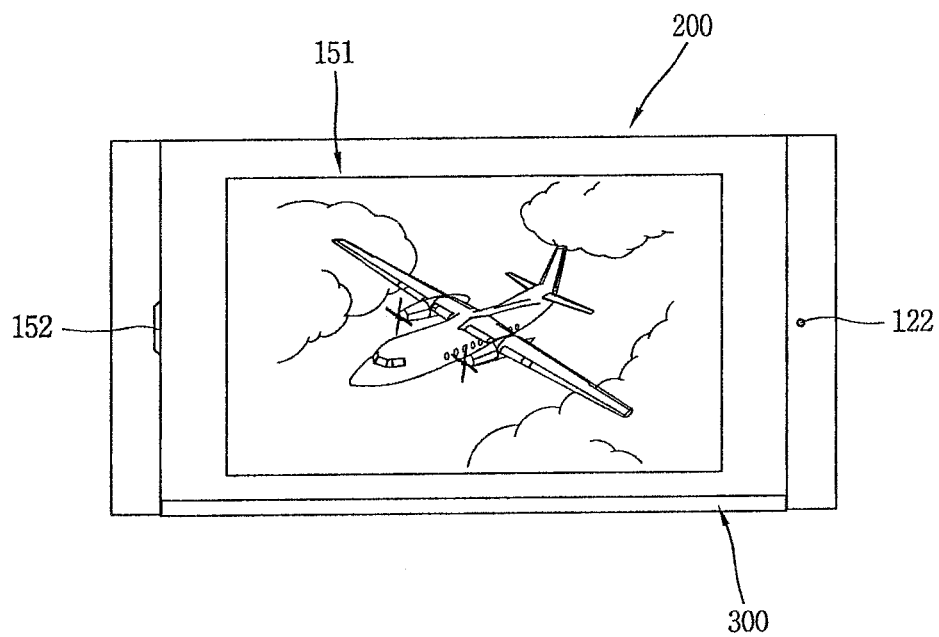
Figure 5C:
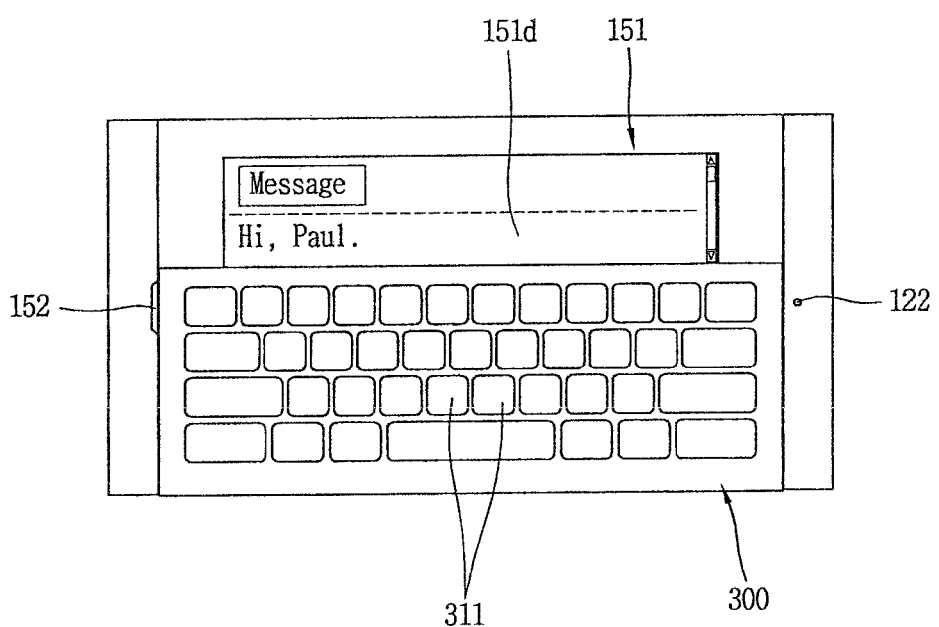

FIGS. 5A to 5C are front views showing first examples of the operational state of the mobile terminal according to an exemplary embodiment of the present invention.

Various types of visual information may be displayed on the touch screen. These information may be displayed in the form of characters, numbers, symbols, graphics, icons, or the like.

In order to input such information, at least one of the characters, numbers, symbols, graphics, and icons may be displayed in a certain array to implement a keypad form. This keypad may be so called a 'soft keypad'.

FIG. 5A shows receiving a touch applied to the soft keys on the touch screen 151 of the mobile terminal, and a phone number input mode is illustrated as an example of the first input mode.

In the present exemplary embodiment, an output window 151a and a soft keypad 151b are displayed as first visual information at upper and lower portions of the touch screen 151. The output window 151a refers to an area from which information inputted through the soft keypad 151b is outputted, and the soft keypad 151b displays numbers for inputting a phone number or the like.

When a particular number key of the soft keypad 151b is touched, a number corresponding to the touched number key is displayed on the output window 151a. When a key for a command for a call is touched, a call connection to the phone number displayed on the output window 151a is attempted.

FIG. 5B shows video or a photo image outputted on the touch screen 151 in a video reproduction mode or a photo output mode. When the FIG. 5A shows a case in which the terminal body 200 is disposed vertically (portrait), FIG. 5B shows a case in which the terminal body 200 is disposed horizontally (landscape). The touch screen 151 may be configured such that an output screen is converted according to a placement direction of the terminal body 200.

In a state that video, a photo image, or the like, is outputted to the first and second areas, namely, to the entire screen, of the touch screen 151, when one portion of the touch screen 151 is touched, soft keys for controlling a corresponding mode can be outputted.

The touch screen 151 may be configured to receive a touch through scrolling as well as the input methods as described above. The user may scroll the touch screen 151 to move a cursor or a pointer positioned on an entity, e.g., an icon, or the like, displayed on the touch screen 151. In addition, when the user moves his finger on the touch screen 151, a path along which the user's finger moves may be visually displayed on the display unit 151. This will be useful in editing an image displayed on the touch screen 151.

When the touch screen 151 is multi-touched within a certain time range, one function of the mobile terminal can be executed. The multi-touching refers to a case in which the user clamps the terminal body by using his thumb and index finger, and the one function may refer to activating or deactivating the touch screen 151.

FIG. 5C shows receiving of information through the flip keypad 300 in the second status of the mobile terminal, and a text message input mode is illustrated as an example of the second input mode.

In the present exemplar embodiment, an output window 151d is displayed as second visual information on the second area R2 of the touch screen 151. When the second visual information is displayed on the second area R2, the first area R1 of the touch screen 151 may be deactivated.

When the user manipulates in a pressing manner the key buttons 311 indicated with text or the like thereon, text corresponding to the manipulated key buttons 311 is displayed on the output window 151d.

Figure 6A:
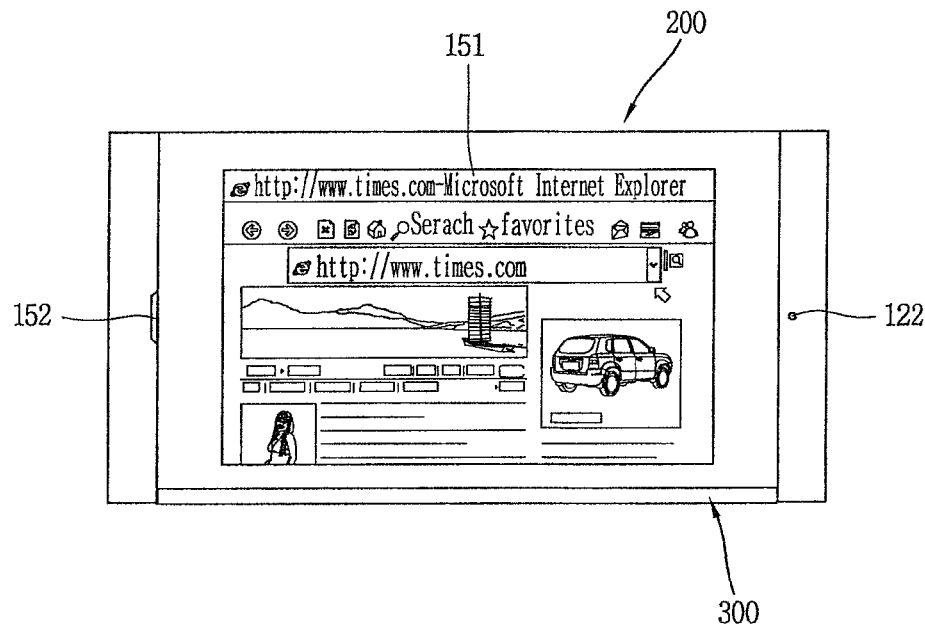
FIGS. 6A and 6B are front views showing second examples of the operational state of the mobile terminal according to an exemplary embodiment of the present invention.
Figure 6B:
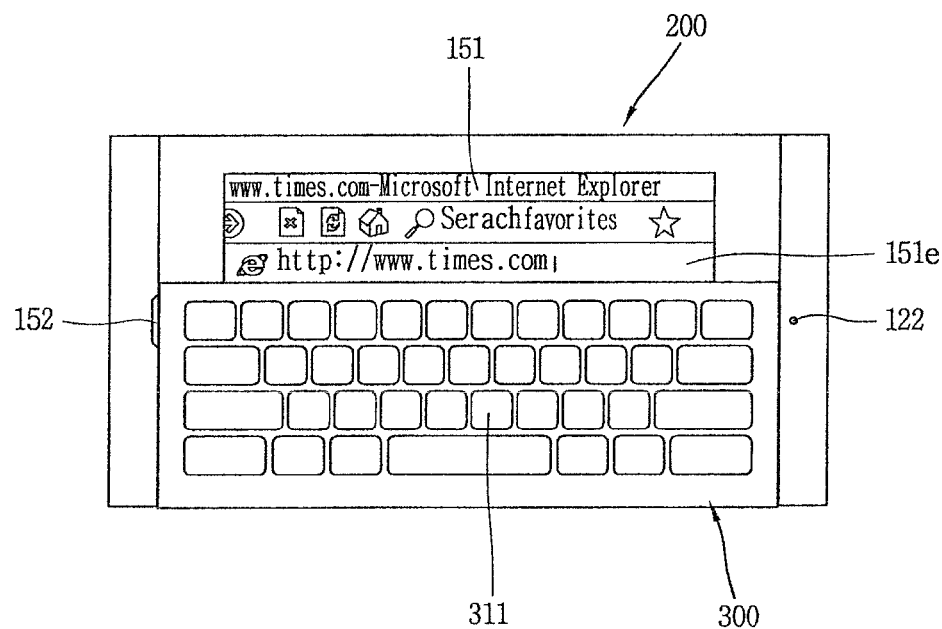

FIGS. 6A and 6B are front views showing second examples of the operational state of the mobile terminal according to an exemplary embodiment of the present invention.

The mobile terminal according to the present invention may be configured to input information by the combined use of the touch screen 151 and the flip keypad 300 when one operation mode is executed. FIGS. 6A and 6B illustrate a Web browsing mode as an example of the operation mode.

As shown in FIG. 6a, a Web browser may be displayed on the touch screen 151, and the user may input various types of information by touching the touch screen in the first input mode. For example, the user may input a command by touching the touch screen or may input a command for adjusting a screen size, a screen shift, or the like, through scrolling, flicking, dragging operations.

In the first status, when the user wants to input text while performing Web browsing (for example, when the user wants to input an address to an address window of the Web browser), the user may mount the flip keypad 300 present on the rear surface of the terminal body 200 to the front surface of the terminal body 200 to change the mobile terminal from the first status to the second status.

In this case, the second input mode may be automatically executed through the flip keypad 300. For example, a cursor may be activated to allow for inputting of text to the address window 151e of the Web browser. When the user manipulates in a pressing manner the key buttons 311, text corresponding to the manipulated key buttons 311 is displayed on the address window 151e.

Figure 7A:
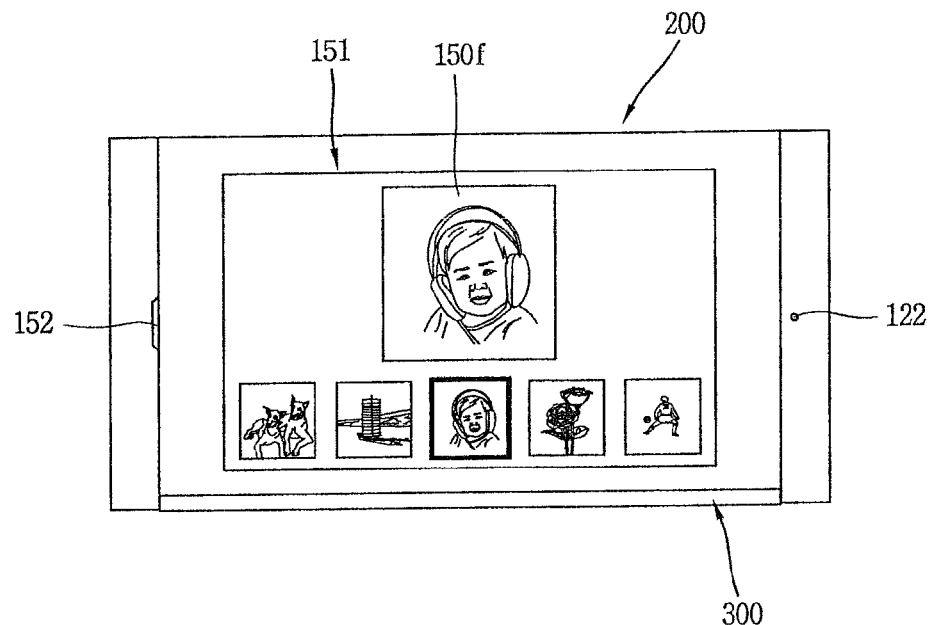
FIGS. 7A and 7B are front views showing third examples of the operational state of the mobile terminal according to an exemplary embodiment of the present invention.
Figure 7B:
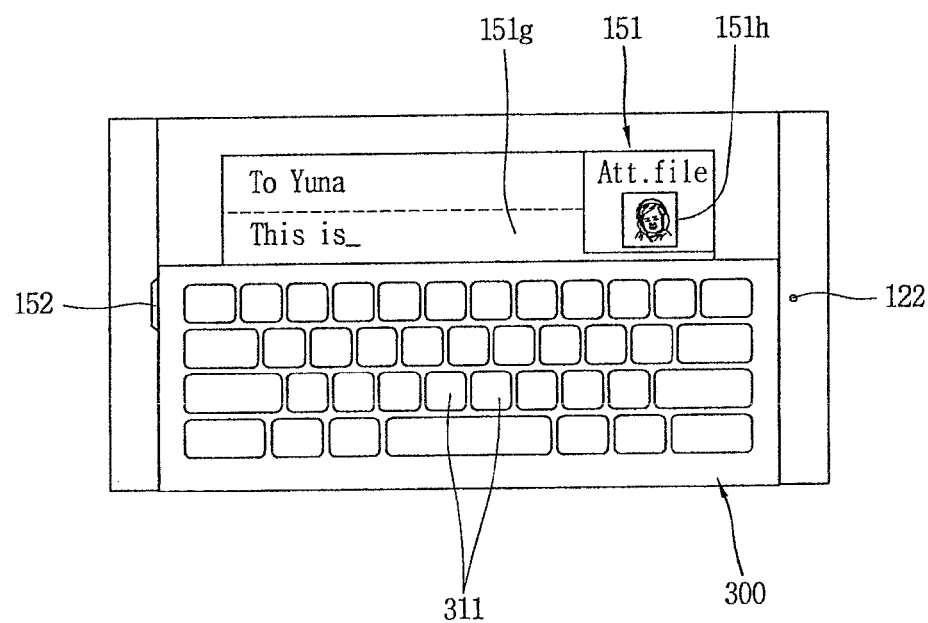

FIGS. 7A and 7B are front views showing third examples of the operational state of the mobile terminal according to an exemplary embodiment of the present invention.

FIG. 7A shows a multimedia search or appreciation mode including photo images image as an example of various utilization modes of the mobile terminal.

As shown in FIG. 7A, a list of photo images are displayed on the touch screen 151. Some of the photo images may be outputted in a preview form 151f. With the photo image selected, the user may position the flip keypad 300 present on the rear surface of the terminal body 200 to the front surface of the terminal body 200. In this case, as shown in FIG. 7B, the touch screen is changed to an editing mode in which the photo image 151f can be sent to a counterpart inputted by the user or a stored counterpart. Namely, a current display state may be changed to a state in which the user can immediately add multimedia and transmit it to a particular person by simply changing the position of the flip keypad 300. In this case, user may create a message along with enclosure of the selected file. File sending may be made through an e-mail, a messenger program, or the like.

Figure 8A:
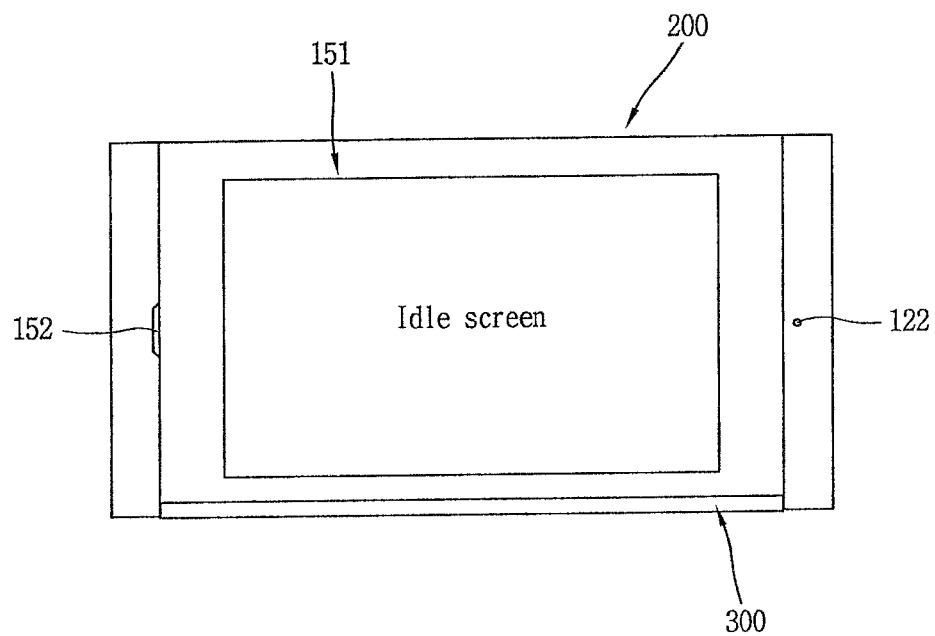
FIGS. 8A and 8B are front views showing fourth examples of the operational state of the mobile terminal according to an exemplary embodiment of the present invention.
Figure 8B:
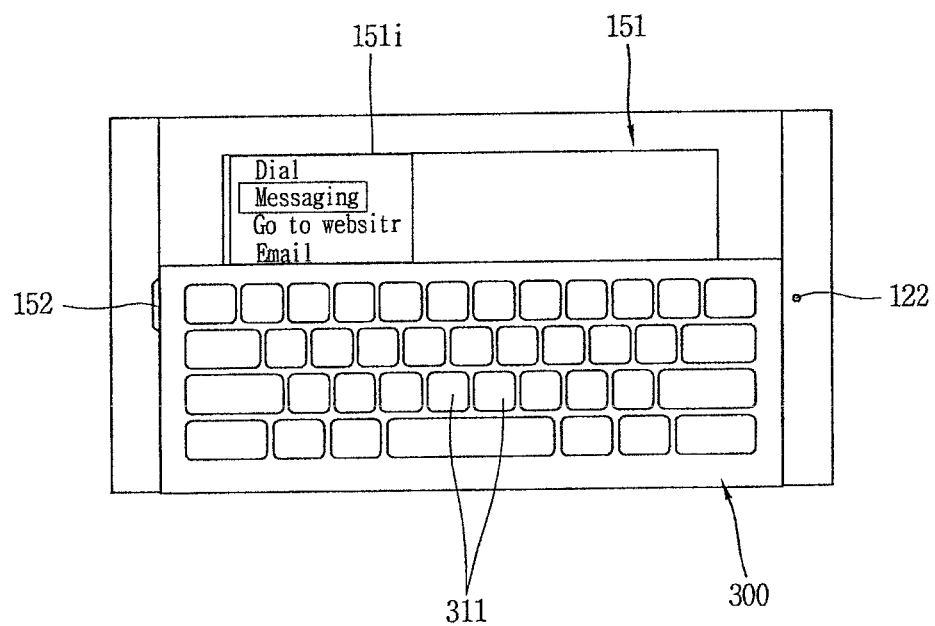

FIGS. 8A and 8B are front views showing fourth examples of the operational state of the mobile terminal according to an exemplary embodiment of the present invention.

As shown in FIG. 8A, the touch screen 151 may output a standby screen image or an idle screen image. In this state, when the flip keypad 300 is moved to be positioned on the front surface of the terminal body 200 from the rear surface of the terminal body 200, a function list 151i related to the use of the flip keypad 300 as shown in FIG. 8B may be displayed on the touch screen 151. The list may include creation and sending of a text message, execution of Web browsing, an e-mail, and the like. The user may select a desired function from the list and execute it.

Figure 9A:
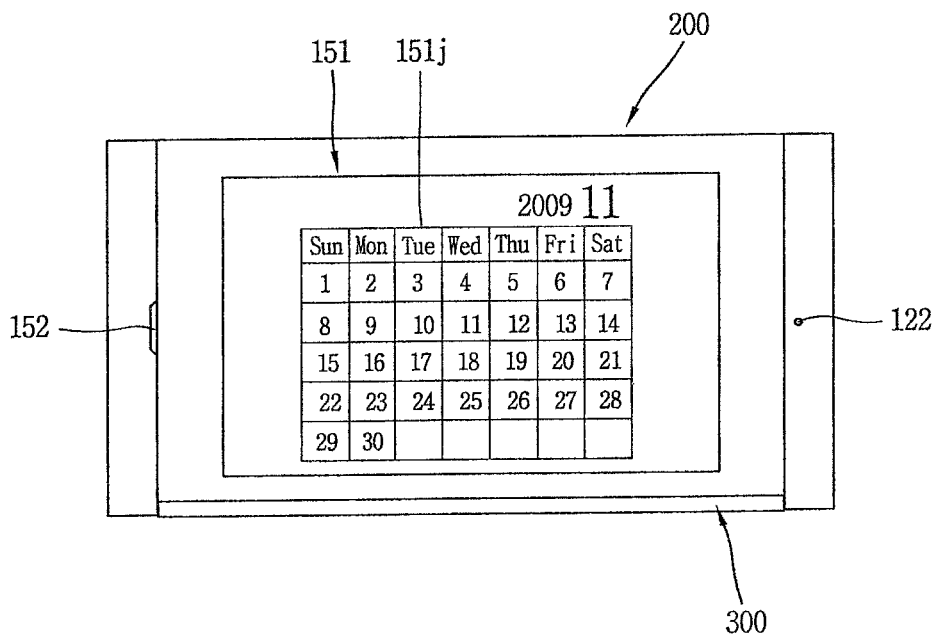
FIGS. 9A and 9B are front views showing fifth examples of the operational state of the mobile terminal according to an exemplary embodiment of the present invention.
Figure 9B:
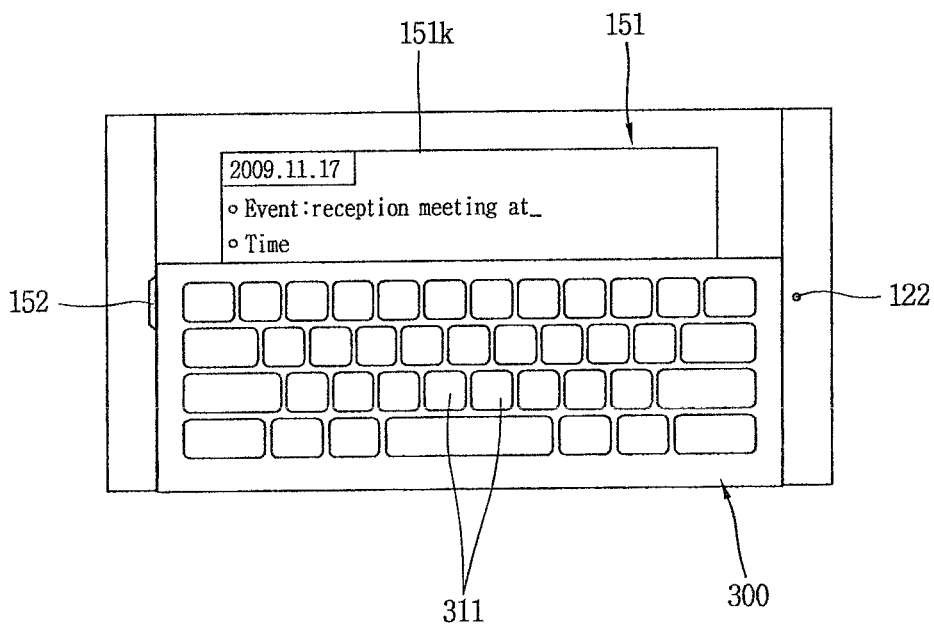

FIGS. 9A and 9B are front views showing fifth examples of the operational state of the mobile terminal according to an exemplary embodiment of the present invention.

In FIGS. 9A and 9B, performing scheduling through a calendar is illustrated as an example of the various utilization modes of the mobile terminal.

As shown in FIG. 9A, a calendar 151j is displayed on the touch screen 151. In this state, the user may move to position the flip keypad 300 on the front surface of the terminal body 200 from the rear surface of the terminal body 200. In this case, as shown in FIG. 9B, information 151k related to an event, time, or the like, to be described with respect to a selected date may be inputted through the flip keypad 300.

Figure 10A:
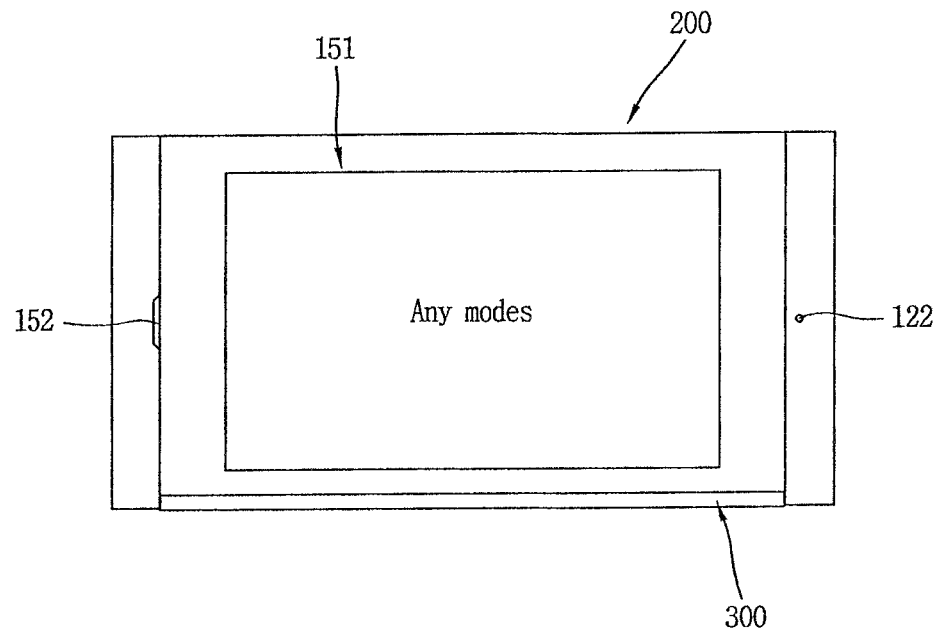
FIGS. 10A and 10B are front views showing sixth examples of the operational state of the mobile terminal according to an exemplary embodiment of the present invention.
Figure 10B:
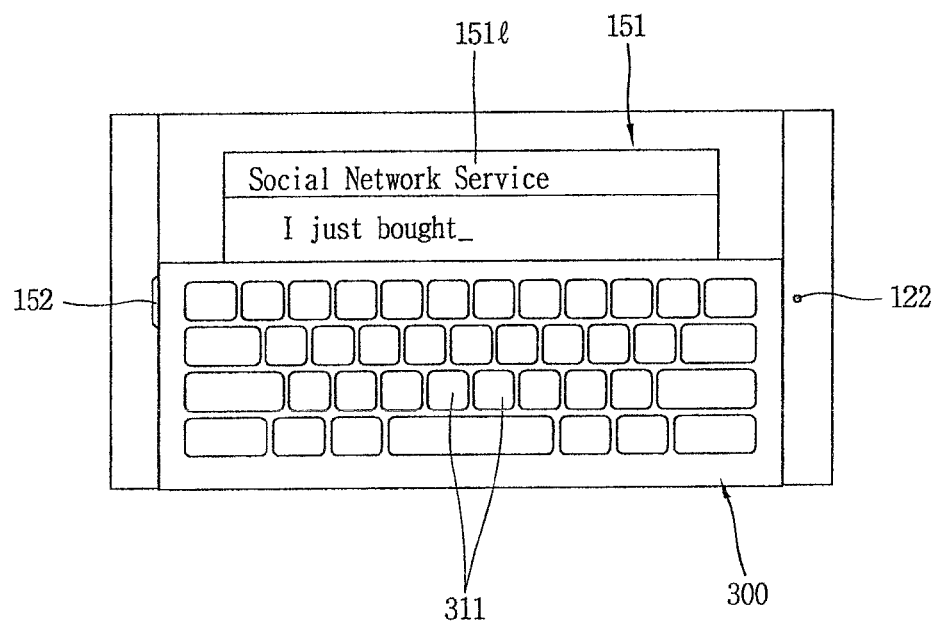

FIGS. 10A and 10B are front views showing sixth examples of the operational state of the mobile terminal according to an exemplary embodiment of the present invention.

As shown in FIG. 10A, the touch screen 151 may output a certain mode. In this state, when the flip keypad 300 of the rear surface of the terminal body 200 is moved to be positioned on the front surface of the terminal body 200, a social network service (SNS) (e.g., twitter, facebook, etc.) may be executed on the touch screen 151 as shown in FIG. 10B. The user then can immediately enjoy SNS by simply changing the position of the flip keypad 300 and directly create a sentence 151l by using the flip keypad 300 on the touch screen 151 and store or transmit the same.

Figure 11A:
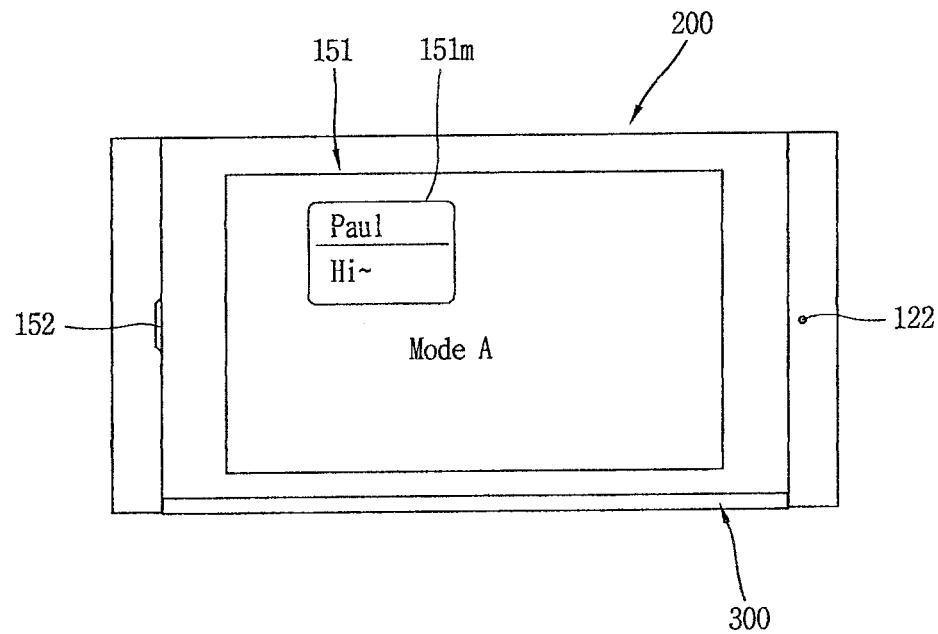
FIGS. 11A and 11B are front views showing seventh examples of the operational state of the mobile terminal according to an exemplary embodiment of the present invention.
Figure 11B:
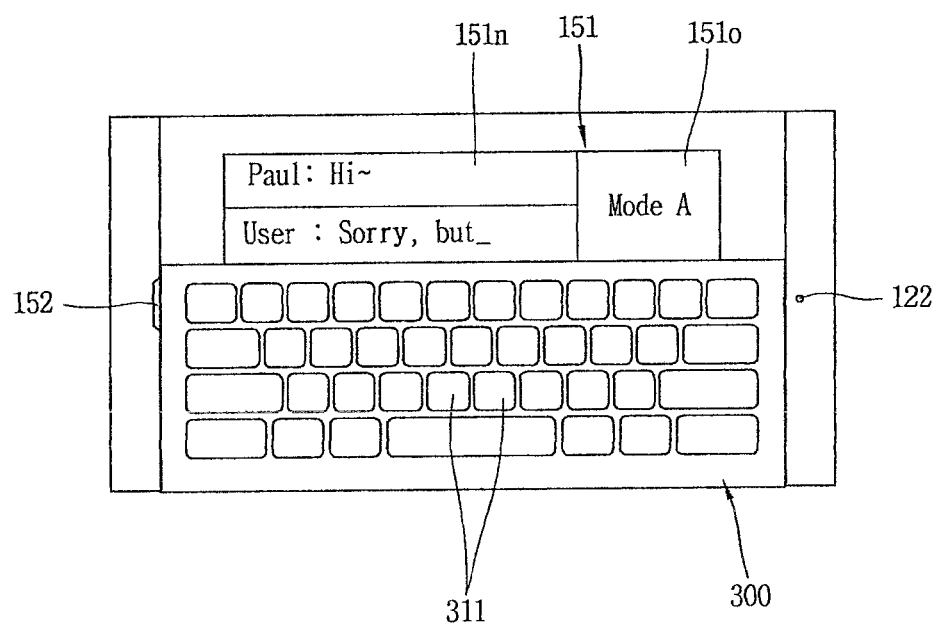

FIGS. 11A and 11B are front views showing seventh examples of the operational state of the mobile terminal according to an exemplary embodiment of the present invention.

As shown in FIG. 11A, in a state that the touch screen 151 executes a certain mode (Mode A), the user may be contacted by a particular person online through a messenger.

In this state, when the flip keypad 300 is moved to be positioned on the front surface of the terminal body 200 from the rear surface of the terminal body 200, a messenger screen image 151n is immediately displayed on the touch screen 151. Conversely, when the flip keypad 300 is moved to be positioned on the front surface of the terminal body 200 from the rear surface of the terminal body 200, the user may determine a counterpart of the messenger and transmit and receive characters in real time.

While the messenger 151n is being executed, a different executed mode 151o is displayed through a different window of the touch screen 151.

Figure 12A:
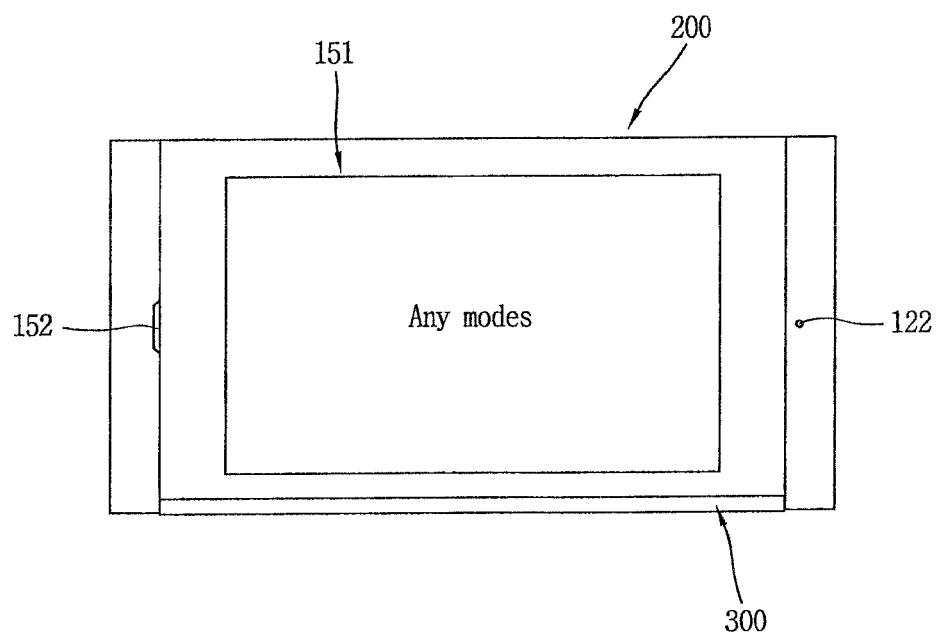
FIGS. 12A and 12B are front views showing eighth examples of the operational state of the mobile terminal according to an exemplary embodiment of the present invention.
Figure 12B:
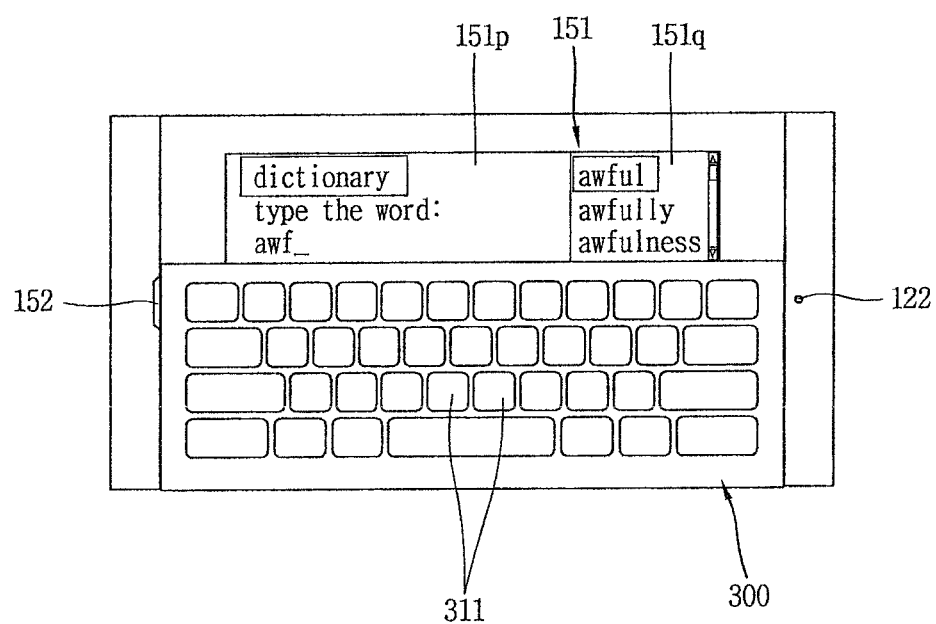

FIGS. 12A and 12B are front views showing eighth examples of the operational state of the mobile terminal according to an exemplary embodiment of the present invention.

As shown in FIG. 12A, while the touch screen 151 is executing a certain mode (Mode B), when the flip keypad 300 is moved to be positioned on the front surface of the terminal body 200 from the rear surface of the terminal body 200, a dictionary look-up function 151n may be immediately displayed on the touch screen 151. Namely, the dictionary function is immediately executed through a changing operation of the flip keypad 300 from a learning mode or in a multimedia appreciation mode. The touch screen 151 may output a word list 151q including letters being typed.

Figure 13:
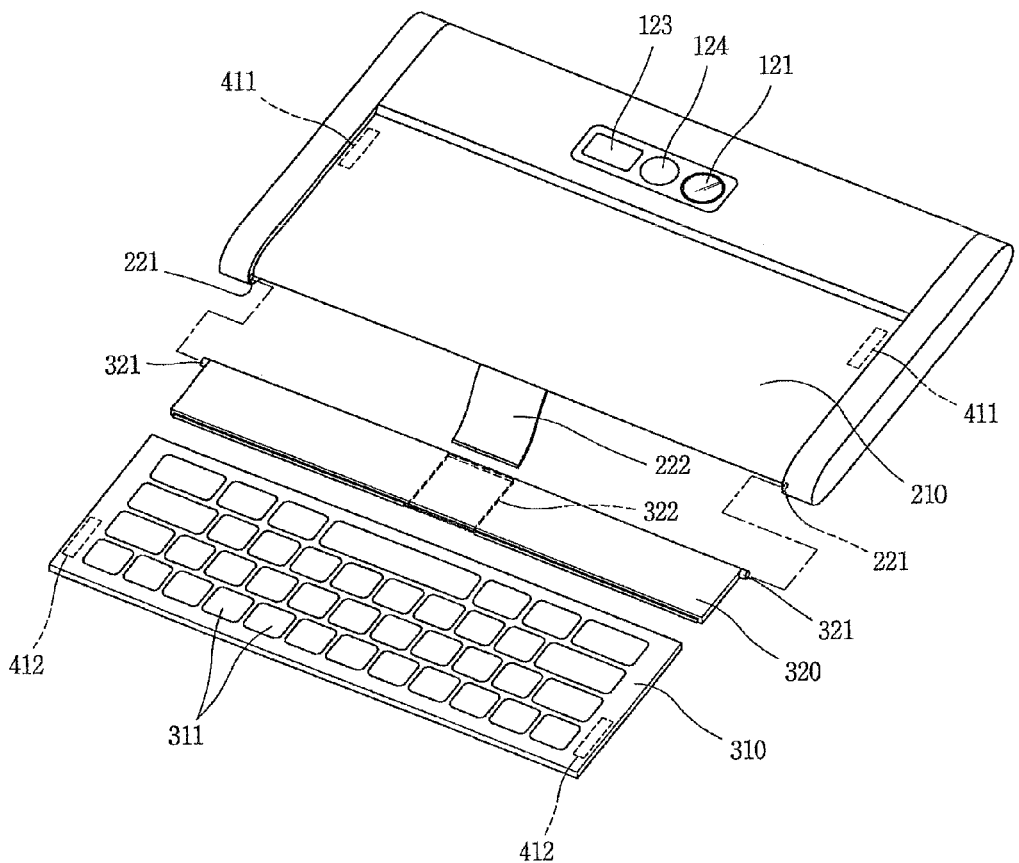
FIG. 13 is an exploded perspective view of the mobile terminal according to an exemplary embodiment of the present invention.

Hereinafter, a detailed structure of the mobile terminal according to an exemplary embodiment of the present invention will now be described. FIG. 13 is an exploded perspective view of the mobile terminal according to an exemplary embodiment of the present invention. Here, is a rear view of the mobile terminal.

The rear surface of the terminal body 200 includes a keypad mounting part 210 allowing the flip keypad 300 to be mounted thereon in the first status. The keypad mounting part 210 may be formed to be recess with a certain depth on the rear surface of the terminal body 200.

A camera 121, a flash 123, a mirror 124, and the like, may be disposed at an upper side of the keypad mounting part 210.

The camera 121 may capture an image of a subject in an image or video capture mode and may be installed on the terminal body such that it can be rotated or popped up. When an image of the subject is captured with a camera 121', the flash 123 illuminates the subject. The mirror 124 allows the user to see himself when he wants to capture his own image (i.e., self-image capturing) by using the camera 121' of the second body 205.

A power supply unit 190 for supplying power to the mobile terminal 100 is mounted in the form of a battery on the terminal body 200. The power supply unit 190 may be installed in the terminal body 200 or may be detachably attached to the terminal body 200.

In the present exemplary embodiment, the connection member 320 is made of a material such as a flexible rubber, silicon, or the like. A rotary protrusion 321 may be formed at an end portion of the connection member 320. The rotary protrusion 321 may be inserted in an insertion recess 221 formed at one end of the terminal body 200 such that it is rotatable in the insertion recess 221.

The terminal body 200 and the keypad main body 310 are electrically connected by a flexible printed circuit board (FPCB). The connection member 320 may include a through hole 322 allowing the FPCB 222 to pass therethrough. The FPCB 222 may be connected with the terminal body 200 and the keypad main body 310 through the through hole 322.

Figure 14:
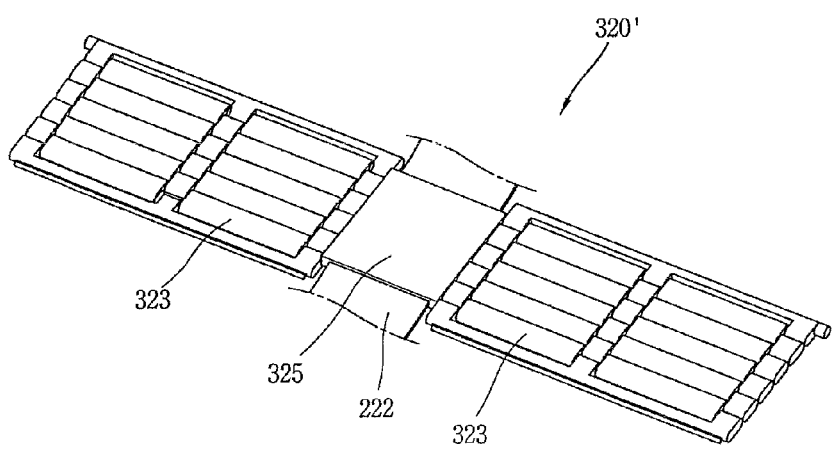
FIG. 14 is a perspective view showing a different embodiment of a connection member applied to a flip keypad according to an exemplary embodiment of the present invention.

FIG. 14 is a perspective view showing a different embodiment of a connection member applied to a keypad according to an exemplary embodiment of the present invention.

A connection member 320' in the present exemplary embodiment includes a first connection member 323 having a form of a chain formed by rotatably connecting a plurality of members and a second connection member 325 made of a material that can be flexibly deformed.

In the present exemplary embodiment, a pair of first connection members 323 are formed, and the second connection member 325 is disposed between the first connection members 323. The first connection members 323 may be made of a metal material, and the second connection member 325 may be made of rubber, silicon, and the like. Here, the second connection member 325 is to provide a displacement space of the FPCB 222. Namely, the FPCB 222 is configured to pass through the second connection member 325.

Figure 15A:
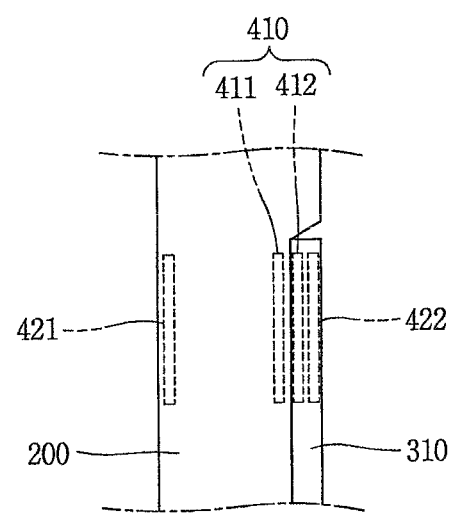
FIGS. 15A and 15B are sectional views showing an example of an attaching and detaching unit applied to the mobile terminal according to an exemplary embodiment of the present invention.
Figure 15B:
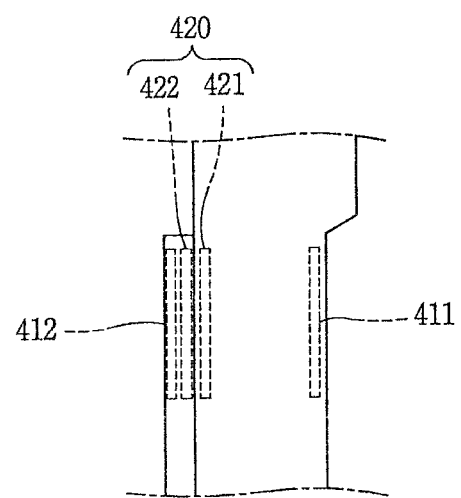

FIGS. 15A and 15B are sectional views showing an example of an attaching and detaching unit applied to the mobile terminal according to an exemplary embodiment of the present invention. FIG. 15A shows the first status of the mobile terminal and FIG. 15B shows the second status of the mobile terminal.

As shown in FIGS. 15A and 15B, the mobile terminal 100 includes an attaching and detaching unit configured to detachably attach the keypad main body 310 to the rear surface and the front surface of the terminal body 200.

In the present exemplary embodiment, the attaching and detaching unit may be implemented by a plurality of magnets generating attraction by magnetic force. These magnets may be disposed within the terminal body 200, without exposing their attachment and detachment structure, so degradation of aesthetic sense otherwise generated as the attachment and detachment structure is exposed from the terminal body 200 can be prevented.

The attaching and detaching unit may include a first attaching and detaching unit 410 configured to attach the first face S1 of the keypad main body 310 to the rear surface of the terminal body 200 in the first status and a second attaching and detaching unit 420 configured to attach the second face S2 of the keypad main body 310 to the front surface of the terminal body 200 in the second status.

As shown in FIG. 15A, the first attaching and detaching unit 410 includes a first magnet 411 disposed on the rear surface of the terminal body 200 and a second magnet 412 disposed on the first face S1 of the keypad main body 310. The first magnet 411 and the second magnet 412 are configured to generate attraction in the first status.

A pair of first magnet 411 may be disposed at two portions of the keypad mounting part 210, and a pair of second magnets 412 may be disposed at positions facing the pair of first magnets 411.

As shown in FIG. 15B, the second attaching and detaching unit 420 may include a third magnet 421 disposed on the front surface of the terminal body 200 and a fourth magnet 422 disposed on the second face s2 of the keypad main body 310. The third magnet 421 and the fourth magnet 422 are configured to generate attraction in the second status.

A pair of third magnets 421 may be disposed at both sides of the touch screen, and a pair of fourth magnets 422 may be disposed at positions facing the pair of third magnets 421 (See FIG. 2B).

The first magnet 411 and the third magnet 421 may be mounted at an inner side of the case constituting the terminal body 200, and the second magnet 412 and the fourth magnet 422 may be mounted at an inner side of the case constituting the keypad main body.

Meanwhile, a magnetic sensor for sensing the strength of a magnetic field generated from at least one of the first to fourth magnets 411, 412, 421, 422 may be used as the attaching and detaching sensor 142. For example, the magnetic sensor mounted at the terminal body 200 measures the strength of a magnetic field generated from the second magnet 412 and the fourth magnet 422, and if the measured strength of the magnetic field is greater than a reference value, the controller 180 recognizes that the keypad main body 310 has been mounted.

Figure 16A:
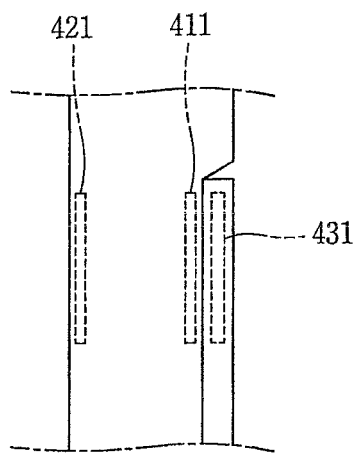
FIGS. 16A and 16B are sectional views showing another example of an attaching and detaching unit applied to the mobile terminal according to an exemplary embodiment of the present invention.
Figure 16B:
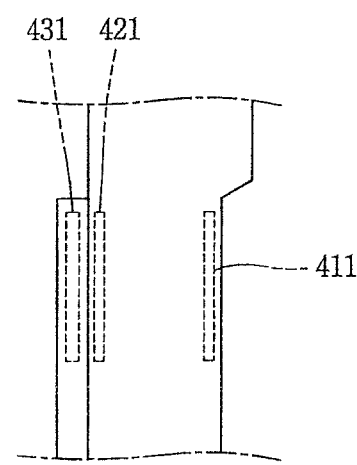

FIGS. 16A and 16B are sectional views showing another example of an attaching and detaching unit applied to the mobile terminal according to an exemplary embodiment of the present invention. FIG. 16A shows the first status of the mobile terminal and FIG. 16B shows the second status of the mobile terminal.

In the present exemplary embodiment, an attaching and detaching unit has the same configuration as that of the former embodiment, except for the second magnet 412 and the fourth magnet 422 of the attaching and detaching unit of the former embodiment.

In the present exemplary embodiment, the second magnet 412 and the fourth magnet 422 of the former embodiment are integrated to be implemented as a single magnet 431. In this case, the both sides of the magnet 431 have different polarities, and the faces of the first magnet 411 and the third magnet 421 facing the magnet 431 may have different polarities from those of the both sides of the magnet 431.

In the present exemplary embodiment, the two magnets 412 and 422 of the former embodiment are implemented as the single magnet 431, the number of magnets can be reduced and a magnet mounting space of the keypad main body 310 can be reduced.

As so far described, the mobile terminal according to at least one of the exemplary embodiments of the present invention is configured such that, in a state that the mechanical keypad is mounted on the rear surface of the terminal body, an input mode is executed through the touch screen, and in a state that the keypad is mounted on the front surface of the terminal body, an input mode is executed through the keypad, thus providing a form factor that can maximize the advantages of the input scheme of the dome switches of the touch screen.

As the exemplary embodiments may be implemented in several forms without departing from the characteristics thereof, it should also be understood that the above-described embodiments are not limited by any of the details of the foregoing description, unless otherwise specified, but rather should be construed broadly within its scope as defined in the appended claims. Therefore, various changes and modifications that fall within the scope of the claims, or equivalents of such scope are therefore intended to be embraced by the appended claims.

What is claimed is:
1. A mobile terminal comprising:
a terminal body having a radio communication function;
a touch screen mounted on a front surface of the terminal body to output visual information;
a flip keypad having a plurality of keys on a surface of the flip keypad, the flip keypad being connected to one end of the terminal body such that the flip keypad is reversibly turned over from a first state in which the flip keypad faces a rear surface of the terminal body to a second state in which the flip keypad faces the front surface of the terminal body; and a controller configured to execute a first input mode through the touch screen in the first state and a second input mode through the flip keypad in the second state, wherein the flip keypad includes:

a keypad main body having a plurality of key buttons, and a connection member rotatably connecting the keypad main body to the terminal body, the connection member is rotatably connected with one end of the terminal body, and when the connection member is brought into contact with the front and rear surfaces of the terminal body, the connection member is deformed to correspond to the front and rear surfaces of the terminal body, wherein the mobile terminal further comprises an attaching and detaching unit configured to detachably attach the flip keypad main body to the rear and front surfaces of the terminal body, wherein the attaching and detaching unit comprises:

a first attaching and detaching unit configured to attach the rear surface of the terminal body and the first face of the flip keypad main body; and a second attaching and detaching unit configured to attach the front surface of the terminal body and the second face of the flip keypad main body, and wherein the first attaching and detaching unit includes a first magnet disposed at the rear surface of the terminal body and a second magnet disposed at the first face of the flip keypad main body and generating attraction with the first magnet, and the second attaching and detaching unit includes a third magnet disposed at the front surface of the terminal body and a fourth magnet disposed at the second face of the flip keypad main body and generating attraction with the third magnet.

2. The mobile terminal of claim 1, wherein the touch screen comprises:

a first area covered by the flip keypad in the second state; and a second area exposed in the second state and outputting information inputted through the flip keypad in the second state.

3. The mobile terminal of claim 2, wherein the touch screen displays first visual information at the first and second areas in the first state, and displays second visual information at the second area in the second state.

4. The mobile terminal of claim 2, wherein the controller controls the touch screen to deactivate the first area in the second state.

5. The mobile terminal of claim 2, wherein a keypad mounting part is formed to be recessed on the rear surface of the terminal body in order to allow the flip keypad to be mounted therein.

6. The mobile terminal of claim 1, wherein the keypad main body comprises:

a first face having key buttons arranged thereon and mounted on the rear surface of the terminal body in the first state; and a second face being in the opposite direction and mounted on the front surface of the terminal body in the second state.

7. The mobile terminal of claim 1, wherein the connection member is made of a material that can be flexibly deformed, or has a form of a chain to which a plurality of members are rotatably connected.

8. The mobile terminal of claim 1, further comprising:

a flexible printed circuit board (FPCB) configured to electrically connect the terminal body and the keypad main body, wherein the connection member comprises a through hole allowing the FPCB to pass therethrough.

9. The mobile terminal of claim 1, wherein the first and second magnets are mounted at an inner side of a case constituting the terminal body, and the second and fourth magnets are mounted at an inner side of a case constituting the keypad main body.

10. The mobile terminal of claim 1, wherein the second and fourth magnets are integrally formed.

11. The mobile terminal of claim 1, further comprising:

an attaching and detaching sensor configured to sense mounting of the keypad main body on the front and rear surfaces of the terminal body and transfer corresponding information to the controller, wherein the sensor is a magnetic sensor for sensing a change in a magnetic field generated from at least one of the first to fourth magnets.

12. A mobile terminal comprising:

a body having a first surface and a second surface;

a touch screen at the first surface of the body, the touch screen to display visual information;

a flip keypad having a plurality of keys, the flip keypad coupled to one end of the body, wherein in a first state the keys to face the second surface of the body, and in the second state the flip keypad is reversibly turned over from the first state such that the keys to face the first surface of the body; and a controller to execute a first input mode to input via the touch screen while in the first state and a second input mode to input via the flip keypad while in the second state, wherein the flip keypad includes:

a keypad having the plurality of keys, and a connection member to rotatably couple the keypad to the body, the connection member is rotatably connected with one end of the body, and when the connection member contacts the first surface, the connection member is deformed based on the first surface of the body, and when the connection member contacts the second surface, the connection member is deformed based on the second surface of the body, wherein the mobile terminal further comprises an attaching and detaching unit to detachably attach the flip keypad to the first and second surfaces of the body, wherein the attaching and detaching unit comprises:

a first attaching and detaching unit to attach the second surface of the body and the first face of the keypad; and a second attaching and detaching unit configured to attach the first surface of the body and the second face of the keypad, and wherein the first attaching and detaching unit includes:

a first magnet at the second surface of the body, and a second magnet at the first face of the keypad and to generate attraction with the first magnet, and the second attaching and detaching unit includes:

a third magnet at the first surface of the body, and a fourth magnet at the second face of the keypad and to generate attraction with the third magnet.

13. The mobile terminal of claim 12, wherein the touch screen comprises:
- a first area to be covered by the flip keypad in the second state; and
- a second area to be exposed in the second state and to display information inputted through the flip keypad in the second state.

14. The mobile terminal of claim 12, wherein the keypad comprises:
- a first face having the keys arranged thereon and mounted on the second surface of the body in the first state; and
- a second face being in an opposite direction as the first face, and the second face mounted on the first surface of the body in the second state.

* * * * *